United States Patent
Thary

[11] Patent Number: 5,840,224
[45] Date of Patent: Nov. 24, 1998

[54] APPARATUS FOR MAKING FORMED LAMINATE

[75] Inventor: Christian Thary, Farmington Hills, Mich.

[73] Assignee: Namba Corporation, Walled Lake, Mich.

[21] Appl. No.: 928,604

[22] Filed: Sep. 12, 1997

[51] Int. Cl.$^6$ ................................................. B29C 44/06
[52] U.S. Cl. ...................... 264/46.4; 264/132; 264/134; 264/161; 264/309; 264/321
[58] Field of Search .................... 264/46.4, 161, 264/309, 321, 132, 134

[56] References Cited

U.S. PATENT DOCUMENTS

| | | | |
|---|---|---|---|
| 3,074,840 | 1/1963 | Teplansky et al. | 264/132 |
| 3,421,967 | 1/1969 | Hochner | 264/132 |
| 3,872,199 | 3/1975 | Ottinger | 264/309 |
| 4,747,346 | 5/1988 | Geel | 101/129 |
| 4,919,862 | 4/1990 | Gilardi | 264/46.4 |
| 5,082,609 | 1/1992 | Rohrlach et al. | 264/309 |
| 5,273,698 | 12/1993 | Thary | 264/46.4 |
| 5,296,182 | 3/1994 | Thary | 264/46.4 |
| 5,389,317 | 2/1995 | Grimmer | 264/309 |
| 5,389,318 | 2/1995 | Thary | 264/46.5 |
| 5,512,233 | 4/1996 | Gallaher et al. | 264/321 |
| 5,525,272 | 6/1996 | Dugdale | 264/134 |
| 5,641,564 | 6/1997 | Thary | 428/314.2 |

*Primary Examiner*—Allan R. Kuhns
*Attorney, Agent, or Firm*—Brooks & Kushman P.C.

[57] ABSTRACT

A method and apparatus (32) for making a three-dimensionally formed laminate (20) by positioning a mask (62) having an opening (64) above a flexible film (52) for rotation therewith such that a foamable liquid mixture (71) sprayed downwardly through the mask opening onto the film is distribute with the predetermined shape of the laminate to be formed. Separation of the mask (62) and the film (52) with the foamable liquid mixture (71) remaining on the film for processing during a transient state after substantial completion of expansion but before substantial curing. A flexible sheet (26) and the film (52) with the foam (71) therebetween are positioned between first and second three-dimensionally contoured mold surfaces (84,86) that are moved toward each other while the foam is in its transitory state to form the flexible sheet and provide a collapsed foam layer (28) that is bonded to the flexible sheet with the predetermined shape as the three-dimensionally formed laminate (20). A first frame (50) supports the film (52) on which the foam is distributed by the rotation on a rotatable table (44), while a second frame provided by a hoop assembly (72) supports the flexible sheet (26). A hooping station (36), a cutting station (40) for trimming foam flash, and a backing station (42) for providing a backing layer are also provided. A second mask (122) is also used to register the collapsed foam layer (28) and the mold surfaces (84,86).

7 Claims, 5 Drawing Sheets

APPARATUS FOR MAKING FORMED LAMINATE

TECHNICAL FIELD

This invention relates to a method and apparatus for making a three-dimensionally formed laminate by a collapsing foam process.

BACKGROUND ART

A method and apparatus for making as well as the resultant product of a formed laminate made by a foam collapsing process are disclosed by the United States patents of Christian Thary U.S. Pat. Nos. 5,273,698, 5,296,182, 5,389,318, and 5,641,564, all of which are assigned to the assignee of the present application and the entire disclosures of which are hereby incorporated by reference. The foam collapsing process for manufacturing of formed laminates is performed by positioning a flexible sheet and a foamable liquid mixture in a transitory state between three-dimensionally contoured mold surfaces of an open mold. In the transitory state, the foamable liquid mixture has substantially completed its expansion, but not yet substantially cured so as to be viscous such that closing of the mold collapses the foam and forms the flexible sheet and the foam into a three-dimensionally formed laminate.

DISCLOSURE OF INVENTION

The present invention provides an improved method and apparatus for making a three-dimensionally formed laminate having a periphery of a predetermined shape by providing good distribution of a foamable liquid mixture that is subjected to a foam collapsing process during forming of the laminate.

In carrying out the above object, the method for making a three-dimensionally formed laminate having a periphery of a predetermined shape is performed by positioning a mask having an opening approximately of the predetermined shape above a flexible film to expose the film upwardly through the opening. The mask and the film are rotated about a generally vertical axis and a foamable liquid mixture is sprayed downwardly through the opening of the rotating mask onto the rotating film to distribute the foamable liquid mixture onto the film in the predetermined shape of the laminate to be formed. The mask and the film are then separated with the foamable liquid mixture remaining on the film and reacting to provide a foam that, after substantial completion of expansion but before substantial curing, has a transitory state when the foamable liquid mixture is still viscous and encloses gas bubbles generated by the reaction. A flexible sheet and the film with the foam thereon are positioned between first and second three-dimensionally contoured mold surfaces, and relative movement of the contoured mold surfaces toward each other is provided when the foam is in that transitory state to form the flexible sheet and provide a collapsed foam layer that is bonded to the flexible sheet with the predetermined shape of the three-dimensionally formed laminate.

It has been found that spraying the foamable liquid mixture during the rotation of the film in association with the mask provides good distribution thereof in a manner that cannot otherwise be achieved and thereby provides an improved resultant product by the foam collapsing processing.

In the preferred practice of the method, the film is located above the foam and the flexible sheet is located below the foam for the forming between the three-dimensionally contoured mold surfaces. One of the three-dimensionally contoured mold surfaces used is a female mold surface that is preferably located below the flexible sheet, and the other three-dimensionally contoured mold surface used is a male mold surface that is preferably located above the film.

In the preferred performance of the method, the film is supported on a first frame that is mounted in a predetermined position with respect to a rotatable table on which the mask is also mounted in a predetermined position to control the location of the foam on the film. The first frame is also subsequently mounted in a predetermined position with respect to the first and second three-dimensionally contoured mold surfaces to control the location of the foam on the film with respect to the mold surfaces. The flexible sheet utilized has printing thereon and is supported on a second frame in a predetermined position with respect thereto, and the second frame is mounted in a predetermined position with respect to the first and second three-dimensionally contoured mold surfaces to control the location of a flexible film and the foam thereon with respect to the printing on the flexible sheet.

In the most preferred practice, a second mask is positioned between the flexible sheet and the film with the foam thereon, and the second mask is positioned to align an edge thereof defining an opening of the predetermined shape of the formed laminate in registration with the printing on the flexible sheet to locate the foam with respect to the printing. After the forming of the flexible sheet and the foam between the three-dimensionally contoured mold surfaces, an angled cutting surface that is heated and engaged with the edge of the second mask to trim foam flash from the formed laminate. Thereafter, a backing layer is secured to the formed laminate by securement thereof to the flexible sheet outwardly from the predetermined shape of its periphery.

In carrying out the above object, the apparatus for making a three-dimensionally formed laminate having a periphery of a predetermined shape includes a rotatable table and a first frame for supporting a film on the rotatable table for rotation with the table. A mask of the apparatus is also positioned on the table above the film for rotation therewith and has an opening approximately of the predetermined shape to expose the film upwardly through the opening. A foam spray gun of the apparatus sprays a foamable liquid mixture downwardly onto the exposed film during rotation thereof with the table to provide a foam that, after substantial completion of the expansion but before substantial curing, has a transitory state when the liquid mixture is still viscous and encloses gas bubbles generated by the reaction. A second frame of the apparatus supports a flexible sheet. A mold of the apparatus includes a pair of mold members having three-dimensionally contoured mold surfaces movable between: an open position spaced from each other to receive the flexible sheet and the film with the foam therebetween after separation of the mask from the film; and a closed position to which the mold surfaces are moved when the foam is in its transitory state to form the flexible sheet and provide a collapsed foam layer that is bonded to the flexible sheet with the predetermined shape as the three-dimensionally formed laminate.

The construction of the apparatus with the rotatable table, the first frame for supporting the film on the rotatable table, the mask positioned on the table to expose the film with the predetermined shape of the laminate to be formed, and the foam spray gun for spraying the foamable liquid mixture onto the exposed film during its rotation with the table provides good distribution of the foam for the foam collapsing process in a manner that has not previously been achieved.

In the preferred construction of the apparatus, the mold includes a lower female mold and an upper male mold.

The preferred construction of the apparatus also has the table, the mask, the mold and the first and second frames provided with alignment formations for registering the foam on the film, printing on the flexible member, and the three-dimensionally contoured mold surfaces.

In its preferred construction, the apparatus also includes a second mask that is positioned between the flexible sheet and the film with the foam thereon. This second mask has an edge defining an opening of the predetermined shape of the formed laminate to prevent the foam from contacting the flexible sheet outwardly of the predetermined shape of the formed laminate. In addition, the apparatus preferably includes a cutting member having an angled cutting surface that is heated and is engaged with the edge of the second mask to trim foam flash from the formed laminate.

Furthermore, the preferred construction of the apparatus further includes a press for heat bonding a backing layer to the flexible sheet outwardly of the predetermined shape of the formed laminate.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
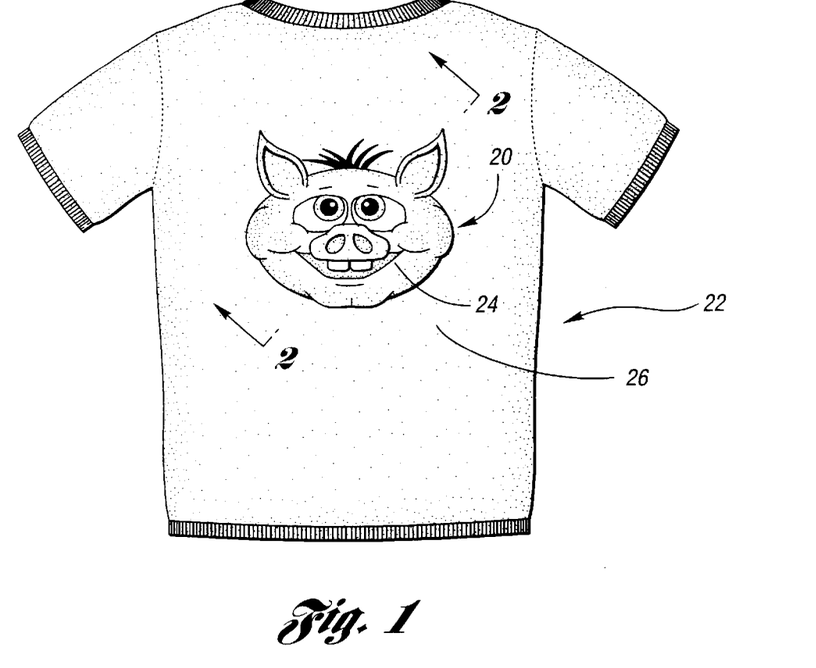
FIG. 1 is a front perspective view of a T-shirt that has been processed by the method and apparatus of this invention to provide a formed laminate having a flexible sheet and a collapsed foam layer.
Figure 2:
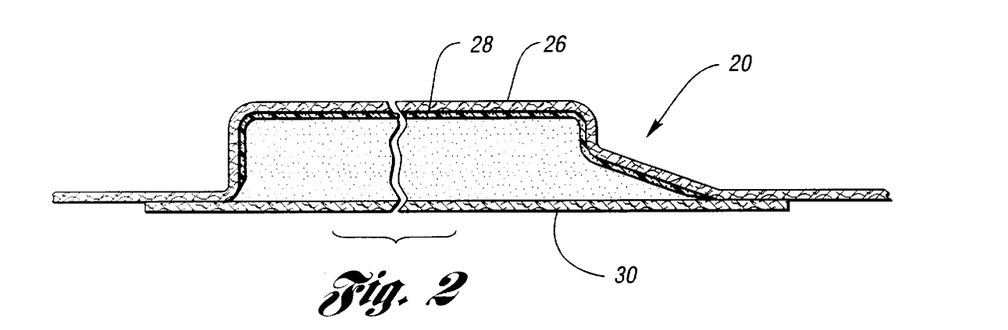
FIG. 2 is a sectional view taken through the formed laminate along the direction of line 2—2 in FIG. 1 to illustrate its construction.

With reference to FIGS. 1 and 2 of the drawings, a three-dimensionally formed laminate 20 is made by the method and apparatus of the invention as is hereinafter more fully described. The description of the method and apparatus which follow are integrated with each other to facilitate understanding of the different aspects of the invention.

As illustrated in FIG. 1, the three-dimensionally contoured formed laminate 20 is shown as part of an article of apparel embodied by a T-shirt 22 and is illustrated as a pig face provided by printing 26 that can be applied to the T-shirt in any suitable manner. In that regard, it should be noted that the term "printing" for purposes of this invention is to be interpreted as broadly as possible to indicate application of pictures, words/letters, and other designs, etc. that can be applied in any suitable manner.

As shown in FIG. 2, the formed laminate 20 includes a flexible sheet 26 which is embodied by porous cloth of the T-shirt 22 and also includes a collapsed foam layer 28 bonded to the flexible sheet in a manner that is hereinafter more fully described. Both the flexible sheet 26 and the collapsed foam layer 28 have three-dimensionally contoured configurations as is hereinafter more fully described. The flexible sheet 26 is also illustrated as having a backing layer 30 that is porous cloth as illustrated and is bonded outside of the periphery of the formed laminate 20 provided by the collapsed foam layer 28.

Figure 3:
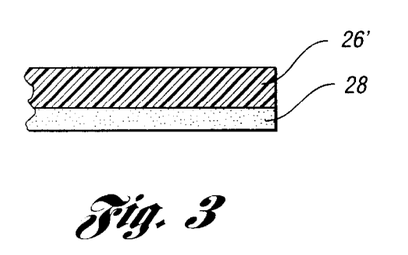
FIG. 3 is a partial sectional view that illustrates the formed laminate as being constructed with a flexible sheet that is vinyl as opposed to the cloth flexible sheet shown in FIGS. 1 and 2.
Figure 4:
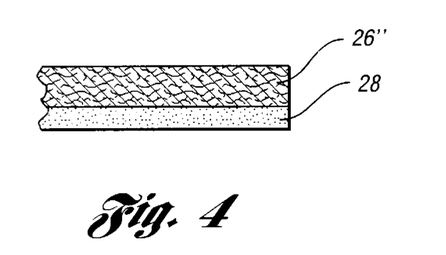
FIG. 4 is a partial sectional view similar to FIG. 3 where the flexible sheet is illustrated as being leather.

With reference to FIGS. 3 and 4, it should be appreciated that the flexible sheet of the formed laminate can be other than cloth such as the vinyl 26' illustrated in FIG. 3 or the leather 26" as illustrated in FIG. 4.

Figure 5:
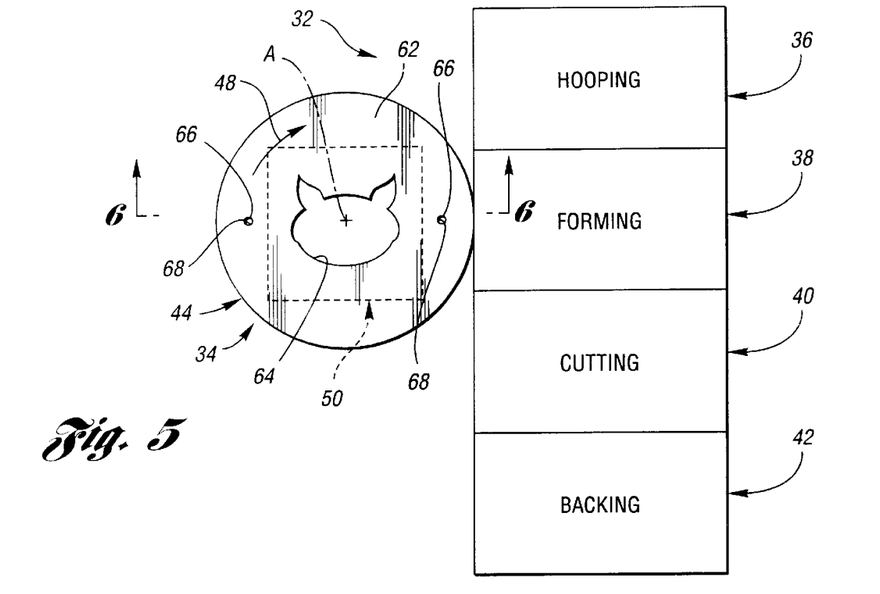
FIG. 5 is a schematic plan view illustrating apparatus of the invention for performing the method thereof for making the formed laminate.

With reference to FIG. 5, apparatus of the present invention is generally indicated by 32 and is disclosed as including a foam spraying station 34, a flexible sheet hooping station 36, a forming station 38, a cutting station 40, and a backing station 42, all of which are hereinafter more fully described.

Figure 6:
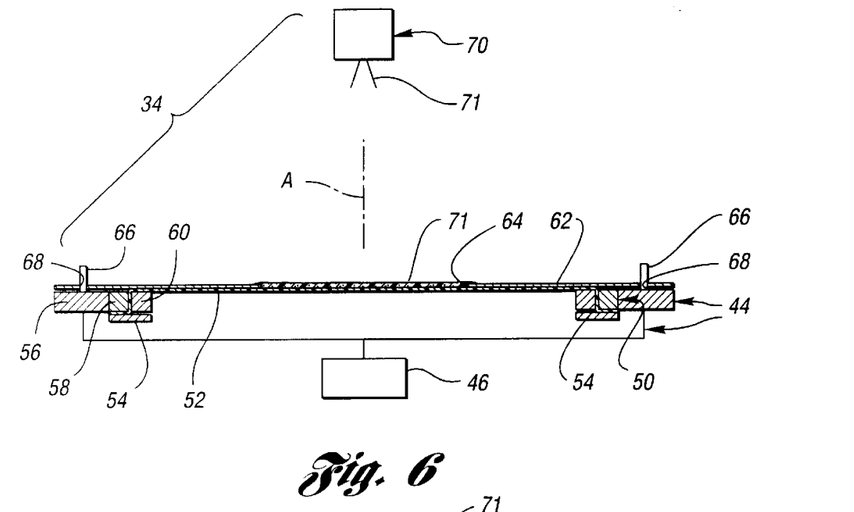
FIG. 6 is a sectional view taken along the direction of line 6—6 in FIG. 5 through a foam spraying station to illustrate a rotatable table and a foam spray gun that sprays a foamable liquid mixture downwardly onto a film that is supported by the table and exposed upwardly through a mask on the table to provide the foam in the shape of the formed laminate.
Figure 8:
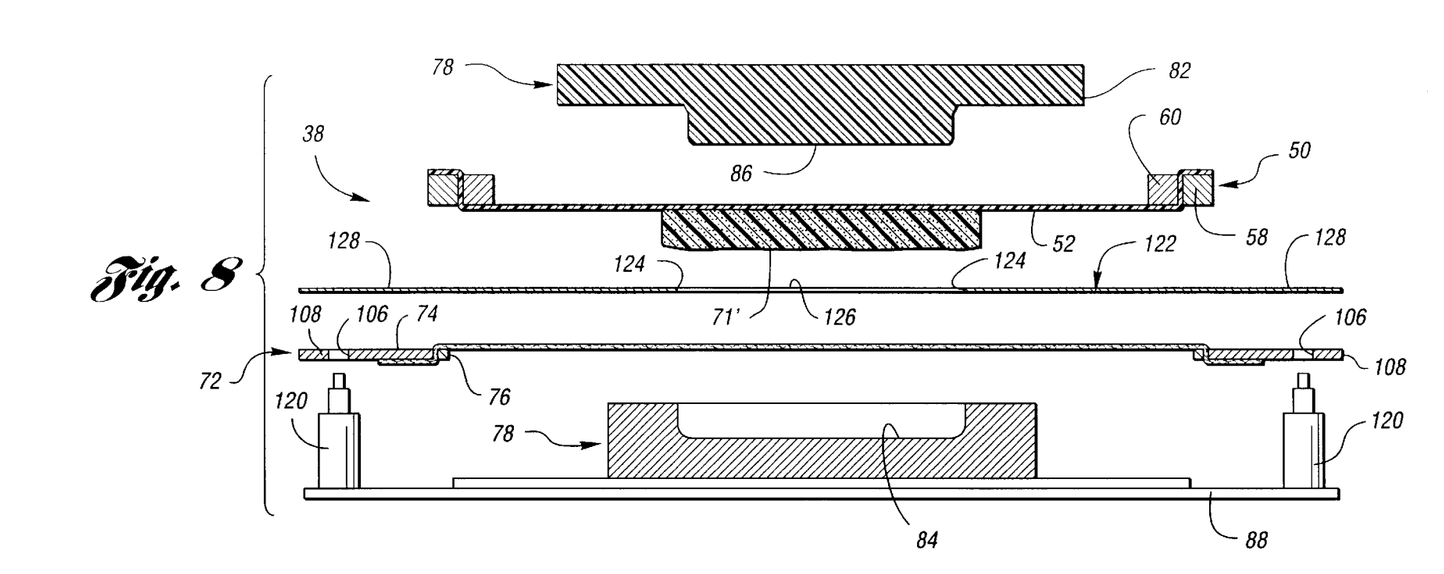
FIG. 8 is a sectional view taken through an open mold whose mold members have three-dimensionally contoured mold surfaces spaced from each other to receive the film with the foam thereon and to also receive a flexible sheet utilized to form the formed laminate, and a second mask utilized in the laminate manufacturing is also illustrated.
Figure 10:
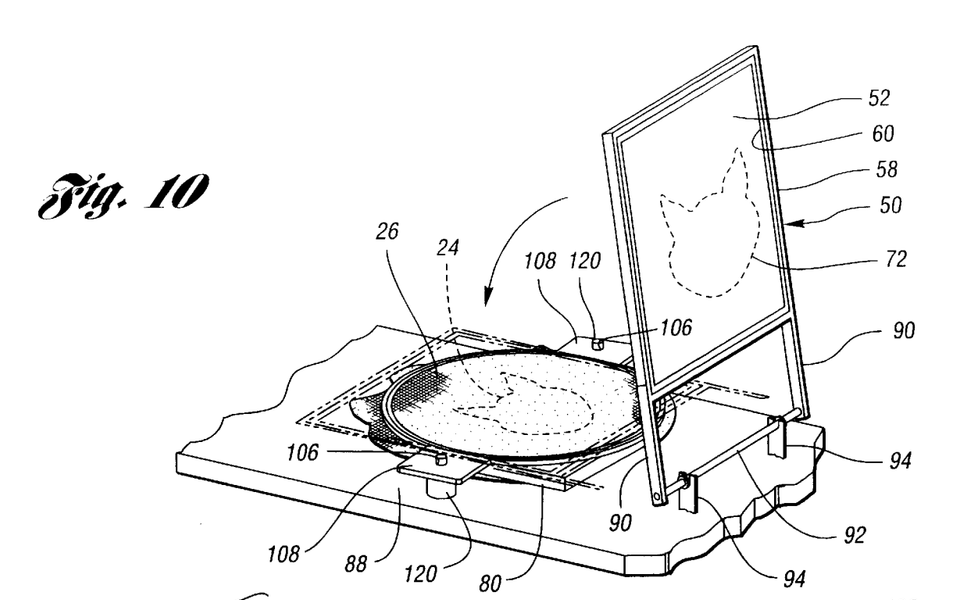
FIG. 10 is a perspective view illustrating mounting of the flexible sheet and the foam on the film with respect to the mold for the foam collapsing process.

With reference to FIGS. 5 and 6, the foam spraying station 34 includes a rotatable table 44 that has a rotary actuator 46 for providing rotation thereof about a generally vertical axis A as illustrated by the arrow 48 shown in FIG. 5. A first frame 50 of the apparatus supports a plastic film 52 as shown in FIG. 6 and is supported on the rotatable table 44 in any suitable manner. More specifically, as illustrated, the table 44 has lower supports 54 and a periphery 56 that cooperatively provide alignment formations for locating the frame 50 with respect to the table. The first frame 50, as illustrated in FIGS. 6, 8 and 10, includes an outer frame member 58 and an inner frame member 60 that is received within the outer frame member with the film 52 located therebetween so as to have a generally planar shape. The film 52 is generally clamped between these as outer and inner frame members 58 and 60, but is somewhat slidable so as to permit sliding thereof during the forming as is hereinafter more fully described.

A first mask 62 of the apparatus, as illustrated in FIGS. 5 and 6, is positioned on the table 44 and has an opening 64 that is approximately of the predetermined shape of the laminate to be formed. The first mask 62, as shown in FIG. 6, is positioned above the film 52 which is thus exposed upwardly through the mask opening 64 that has the shape of the pig face to be formed as the laminate. In actuality, the mask opening 64 is slightly larger in size than the resultant pig face, as is hereinafter more fully described. Pins 66 on the table 44 and holes 68 in the mask 62 cooperatively provide alignment formations that position the mask opening 64 with respect to the table and hence with respect to the film 52 on the first frame 50 that is also positioned with respect to the table.

Figure 7:
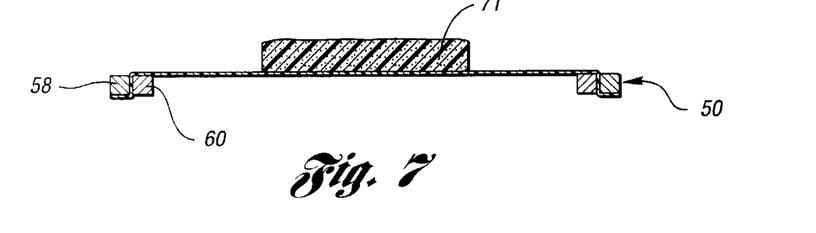
FIG. 7 is a view illustrating the film with the foam thereon and supported by a frame after separation of the mask from the film.

As illustrated in FIG. 6, the foam spraying station 34 of apparatus 32 also includes a foam spray gun 70 that is located above the rotatable table 46 in any suitable manner to spray a foamable liquid mixture a 71 downwardly onto the exposed film 52 during rotation thereof on the table 44 for reaction of the mixture on the film to provide a foam that, after substantial completion of expansion as shown in FIG. 7 but before substantial curing, has a transitory state when the liquid mixture is still viscous and encloses gas bubbles generated by the reaction. The mask 62 is removed from the film as shown in FIG. 7 such that the expanded foam 71 has the shape of the laminate to be formed.

Figure 12:
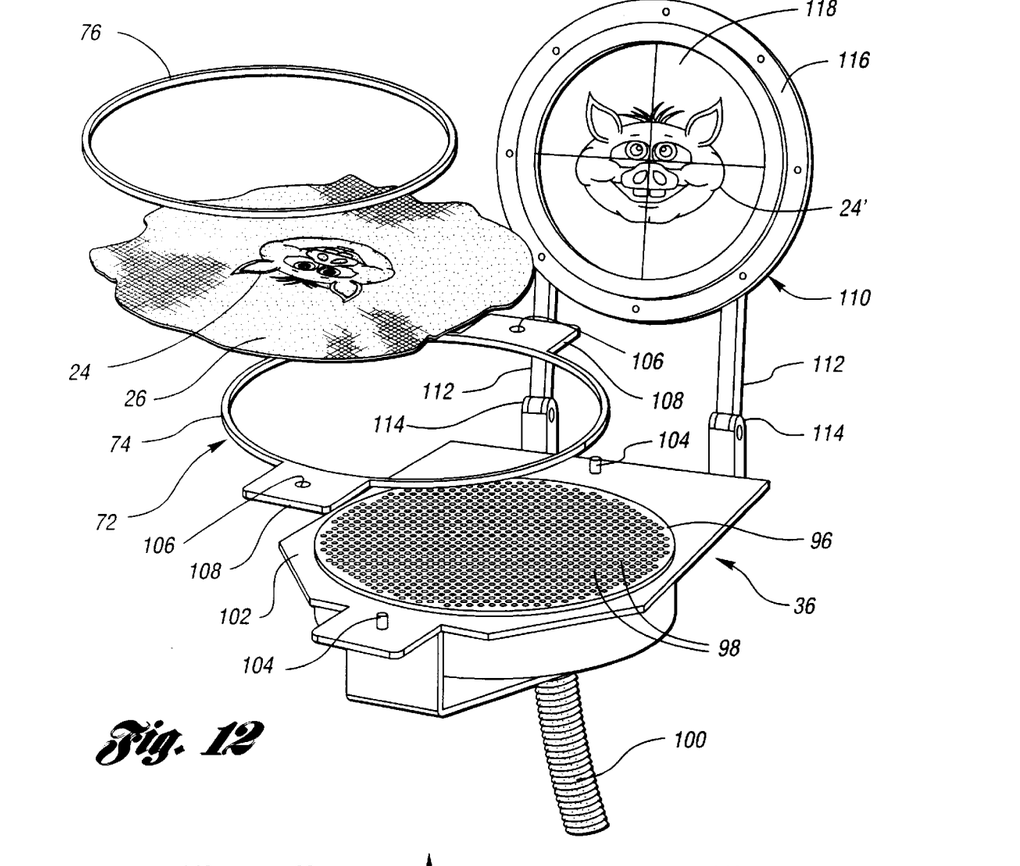
FIG. 12 is an exploded perspective view of a hooping station illustrating the manner in which printing on the flexible sheet is registered with a frame provided by a hoop assembly to permit subsequent registration of the printing with the foam during the foam collapsing formation of the laminate.

With reference to FIGS. 8, 10 and 12, a second frame embodied by a hoop assembly 72 supports the flexible sheet 26. This hoop assembly 72 includes an outer hoop 74 and an inner hoop 76 that is received within the outer hoop with the flexible sheet 26 clamped therebetween such that the flexible sheet assumes a generally planar shape as best shown in FIG. 8.

Figure 9:
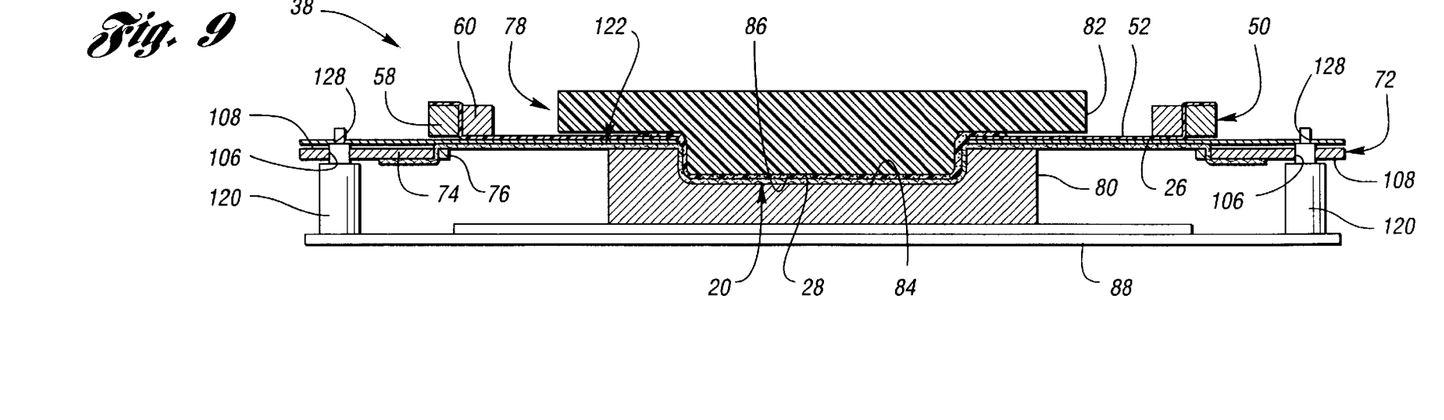
FIG. 9 is a view similar to FIG. 8 after closing of the mold such that the three-dimensionally contoured mold surfaces thereof collapse the foam and provide forming thereof with the flexible sheet as the formed laminate.

The forming station 38 of the apparatus, as schematically illustrated in FIG. 5, is more fully illustrated in FIGS. 8 and 9 and includes a mold 78 having a pair of mold members 80 and 82 that have three-dimensionally contoured mold surfaces 84 and 86, respectively, that are shaped to define the formed laminate. The mold 78 is movable between the open position of FIG. 8 and the closed position of FIG. 9 by any suitable type of actuation. In the open position of FIG. 8, the mold members 80 and 82 are spaced from each other and the first frame 50 supports the film 52 with the expanded foam 71 thereon between the contoured mold surfaces 84 and 86. Furthermore, the second frame provided by the hoop assembly 72 supports the flexible sheet 26 between the contoured mold surfaces with the expanded foam 71 located between the film 52 and the flexible sheet. Movement of the mold 78 from the open position of FIG. 8 to the closed position of FIG. 9 takes place while the expanded foam 71 is in its transitory state after substantial completion of the expansion, but before any substantial curing such that the foam material is still viscous. As such, the foam 71 collapses during the forming between the three-dimensionally contoured mold surfaces 84 and 86, while the flexible sheet 26 is also formed therewith to provide the formed laminate previously described in connection with FIGS. 1 and 2.

During the processing as described above, the foamable liquid mixture will expand on the order of about 20 times upon forming the foam prior to compression during the closing of the mold 78. After the compression, the collapsed foam layer will have a thickness in the range of about 1/7 to 1/5 of its expanded thickness and normally about 1/6 of its expanded thickness which is thus about 3 or 4 times or so the original volume of the foamable liquid mixture sprayed by the spray gun 70 shown in FIG. 6. During such spraying, the rotation of the table 44 provides good distribution of the foam in a manner that has heretofore not been achieved. Good results have been achieved when the table is rotated at approximately 1 revolution per second, although the best speed will depend upon each particular foam and its viscosity, etc. The rotational speed should be sufficiently fast so that the spray is distributed in a very thin pitched screw shape such that the oldest foam is contacted with the film 52 while the freshest foam is exposed for contact with the flexible sheet. Also, it is desirable for the rotation to be sufficiently fast so that centrifugal force helps in providing a uniform foam spreading but not so much as to starve the center at the axis of rotation from the required amount of foam.

It is preferable to utilize relatively fast-acting foam such as polyurethane foams or polyurea foams such that completion of the expansion will take place in about 3 to 25 seconds, and most preferably in the range of about 3 to 15 seconds and with complete curing taking place in about 10 to 15 minutes. The collapsing of the foam for forming the laminate should not be performed until substantially all of the expansion, i.e. 90% and most preferably 95% has taken place so that the force that compresses and collapses the foam and forms the laminate does not have to counteract the expansion as the gas is generated. However, the compression of the foam has to be performed before substantial curing has taken place so that the foam is still fragile, i.e. the cellular walls in which the gas is located must be still viscous such that the larger gas bubbles burst even though the smaller ones do not due to the surface tension of the cellular walls. The extent of the foam collapse is somewhat localized such that the compression must be performed over the entire extent of the formed laminate. The resultant foam will have about 2/3 to 3/4 by volume of gas and the remainder reacted polymer, as opposed to 95% gas and the remainder polymer for normal foams. The collapsed foam will thus have a density in the range of about 0.25 to 0.33 and most normally about 0.30 of the density of water.

With specific reference to FIG. 8, the processing is preferably performed with the film 52 located above the expanded foam 71 and with the flexible sheet 26 located below the foam for the forming between the three-dimensionally contoured mold surfaces 84 and 86. More specifically, as illustrated, the mold 78 has the lower mold 80 provided with a three-dimensionally contoured female mold surface 84 located below the flexible sheet 26 and with the upper mold 82 having a three-dimensionally contoured male mold support 88 located above the film 52.

As previously discussed in connection with FIG. 6, the film 52 is mounted in a predetermined position with respect to the rotatable table 44 to control the location of the foamable liquid mixture 71 and the resultant expanded foam on the film. In addition, the first frame 50, as shown in FIG. 10, is subsequently mounted in a predetermined position with respect to the first and second three-dimensionally contoured mold surfaces 84 and 86 of the mold 78 described in connection with FIGS. 7 and 8. More specifically, as shown in FIG. 10, the first frame 50 has legs 90 and a positioning shaft 92 extending between the leg ends. Positioners 94 on the lower mold support 88 receive the positioning shaft in an axially located relationship with respect thereto. Thus, pivoting of the first frame 50 moves the film 52 downwardly and into a predetermined position with respect to the lower mold 80 and also with respect to the upper mold which is subsequently moved downwardly as previously described to perform the laminate forming. Thus, the expanded foam 71 is registered with respect to the mold surfaces for the forming.

The hooping station 36 schematically illustrated in FIG. 5 is more specifically illustrated in FIG. 12 and includes a vacuum platen 96 having apertures 98 through which a vacuum is selectively drawn by a conduit 100 under the control of an unshown valve. The vacuum platen 96 is mounted by a support 102 and projects upwardly slightly from the support approximately the thickness of the outer hoop 74. Pins 104 project upwardly from the support 102 and are received by holes 106 in positioning tabs 108 of the outer hoop 74. The vacuum platen 96 then projects upwardly within the outer hoop 74, and the pins 104 and holes 106 thus provide alignment formations for positioning of the hoop assembly with respect to the vacuum platen 96.

With continuing reference to FIG. 12, the hooping station 36 also includes a positioning assembly 110 having legs 112 with pivotal connections 114 to the support 102. A round positioning member 116 supported by the legs 112 carries a transparent pattern 118 including printing 24' corresponding to the printing 24 on the flexible sheet 26 to be made as the formed laminate. The positioning assembly 110 is then pivoted downwardly over the flexible sheet 26 and adjustment of the flexible sheet aligns the printing 24 thereon with the patterned printing 24' so as to provide location thereof with respect to the outer hoop 74. After such alignment, a vacuum is drawn to hold the flexible sheet 26 in position with respect to platen 96 and the positioning assembly 110 is then raised upwardly. The inner hoop 76 is then inserted downwardly into the outer hoop 74 whereupon the vacuum platen 96 moves downwardly with respect to the support 102 under a spring-biased mounting thereof. Termination of the vacuum and removal of the hoop assembly from the hooping station 36 then U provides a frame on which the printing 24 of the flexible sheet 26 carried thereby is mounted in a predetermined position.

After hooping of the flexible sheet 26 by the hoop assembly as described above, the hoop assembly 72 is then moved to the forming station 38 shown in FIG. 8 and its positioning tabs 108 are positioned by positioners 120 of the lower mold support 88 as also shown in FIGS. 9 and 10 to thereby provide accurate location of the printing with respect to the mold surfaces. It should be noted that the printing on the flexible member 26 then faces downwardly as illustrated in FIG. 8 away from the expanded foam 71 carried by the film 52. Thus, the positioners 120 and the holes 106 of the outer hoop positioning tabs 108 provide alignment formations that register the printing on the flexible sheet 26 with the mold surfaces and hence with the expanded foam 71 carried by the first frame 50. In addition, the first frame 50 is also positioned with respect to the mold surfaces by the positioning previously described in connection with FIG. 10. As such, closing movement of the mold 78 from the open position of FIG. 8 to the closed position of FIG. 9 provides the forming of the laminate with the foam aligned with the printing on the flexible sheet.

With reference to FIG. 8 of the drawings, the apparatus also utilizes a second mask 122 that is positioned between the flexible sheet 26 and the film 52 with the foam thereon and includes an edge 124 defining an opening 12G of the predetermined shape of the formed laminate to be made. Holes 128 in the second mask are received by the positioners 120 that also position the hoop assembly 72 and thereby provide registration of the opening 126 with the printing on the flexible sheet 26 to locate the foam with respect to the printing. During the forming as the mold 78 is moved to the closed position, any excess foam due to the slightly larger size of the previously mentioned opening of the first mask is thus prevented from contacting the flexible sheet 26 by the second mask 122. Nevertheless, the slightly larger size of the first mask opening ensures that there will be sufficient foam over the entire extent of the laminate, while the second mask limits the foam to the intended location. The second mask is most preferably spring steel that is as thin as possible for effective processing, with good results being achieved with a thickness of 0.4 mm., while thinner trials with a thickness of 0.2 mm. have been found to be too thin.

Figure 11:
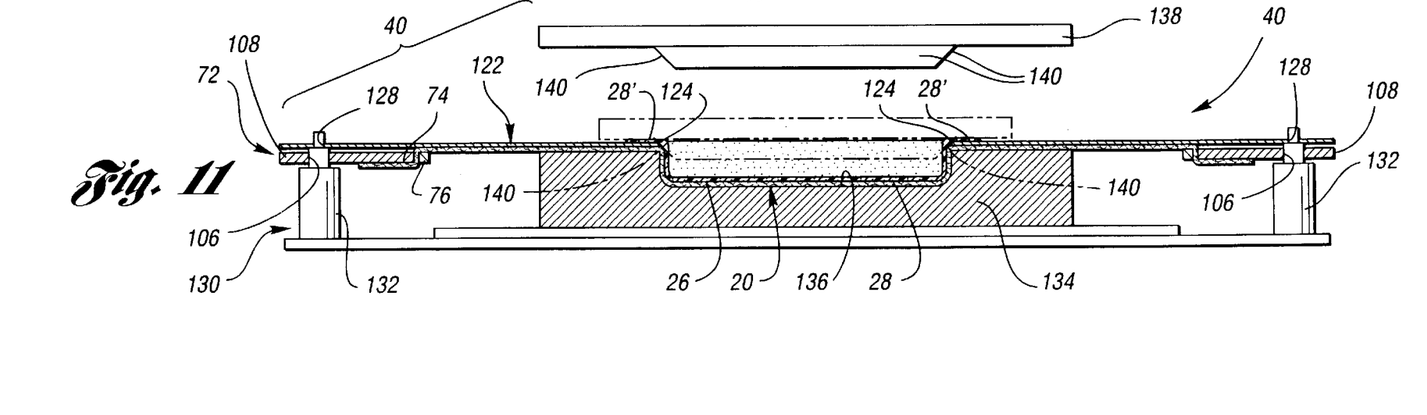
FIG. 11 is a partial sectional view through a cutting station that trims foam flash from the formed laminate.

The cutting station 40 schematically illustrated in FIG. 5 is more specifically illustrated in FIG. 11 and includes a lower support generally indicated by 130 on which the hoop assembly 72 and the second mask 122 are supported. More specifically, positioners 132 of the lower support 130 receive the positioning holes 106 of the hoop assembly outer hoop tabs 108 and also receive the positioning holes 128 of the second mask 122 so as to provide accurate location of the formed laminate with respect to a lower female mold support 134 having a support cavity 136 that receives the formed laminate 20. Cutting station 40 also includes an upper cutting member 138 having an angled cutting surface 140 that is heated and that is moved downwardly from the solid line indicated position to the phantom line indicated position to engage the edge 124 of the second mask 122 and thereby cut through the collapsed foam layer 28 to remove foam flash 28'. The heating of the cutting member 138 and hence the cutting surface 140 heats the collapsed foam layer 28 adjacent the second mask edge 124 to weaken the foam layer and ensure cutting away of the foam flash 28'. Good results have been achieved when the cutting member 138 is made of brass to transfer heat and the cutting surface 140 is hardened steel. The cutting member 138 has been heated to about 400° F. to provide good results.

Figure 13:
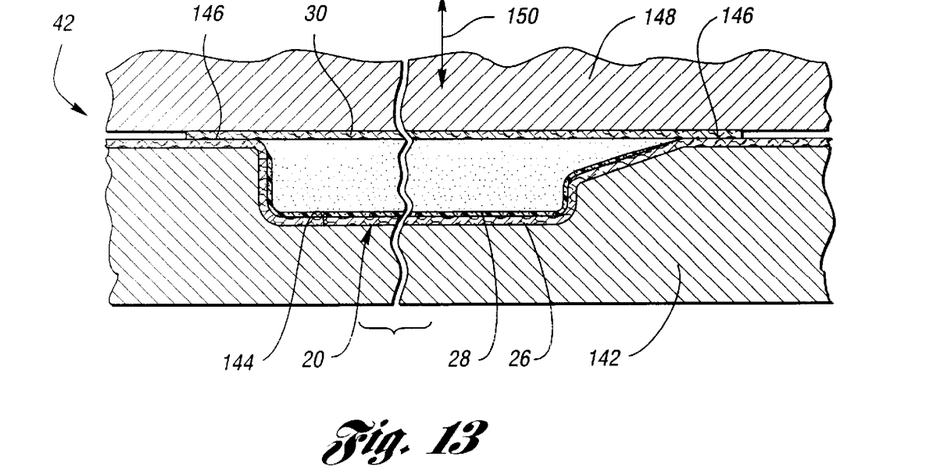
FIG. 13 is a sectional view illustrating a backing station at which a backing layer is applied to the formed laminate to complete its manufacturing.

The backing station 42, schematically illustrated in FIG. 5, is more specifically illustrated in FIG. 13 and includes a lower female mold support portion 142 having a cavity 144 that receives the formed laminate 20 after the foam flash has been removed as described above in connection with FIG. 9. A backing layer 30, such as of cloth, is positioned over the back side of the formed laminate 20 and has an edge including a suitable heat set adhesive 146. Thereafter, a heated upper press 148 is moved downwardly as shown by the lower portion of arrow 150 such that the adhesive 146 secures the backing layer 30 to the flexible sheet 26 outside the predetermined shape of the formed laminate 20. The heated press 148 is moved upwardly as shown by the upper portion of arrow 150 to permit removal of the flexible sheet 26 including the formed laminate.

While the best modes for carrying out the invention have been described in detail, those familiar with the art to which this invention relates will recognize various alternative designs and embodiments for practicing the invention as defined by the following claims.

What is claimed is:

1. A method for making a three-dimensionally formed laminate having a periphery of a predetermined shape, comprising:

positioning a mask having an opening approximately of the predetermined shape above a flexible film to expose the film upwardly through the opening;

rotating the mask and the film about a generally vertical axis;

spraying a foamable liquid mixture downwardly through the opening of the rotating mask onto the rotating film to distribute the foamable liquid mixture onto the film in the predetermined shape of the laminate to be formed;

separating the mask and the film with the foamable liquid mixture remaining on the film and reacting to provide a foam that, after substantial completion of the expansion but before substantial curing, has a transitory state when the liquid mixture is still viscous and encloses gas bubbles generated by the reaction; and positioning a flexible sheet and the film with the foam therebetween between first and second three-dimensionally contoured mold surfaces and providing relative movement of the contoured mold surfaces toward each other when the foam is in said transitory state to form the flexible sheet and provide a collapsed foam layer that is bonded to the flexible sheet with the predetermined shape as the three-dimensionally formed laminate.

2. A method for making a three-dimensionally formed laminate as in claim 1 wherein the film is located above the foam and the flexible sheet is located below the foam for the forming between the three-dimensionally contoured mold surfaces.

3. A method for making a three-dimensionally formed laminate as in claim 2 wherein one of the three-dimensionally contoured mold surfaces used is a female mold surface that is located below the flexible sheet, and wherein the other three-dimensionally contoured mold surface used is a male mold surface that is located above the film.

4. A method for making a three-dimensionally formed laminate as in claim 1 wherein the film is supported by a first frame that is mounted in a predetermined position with respect to a rotatable table on which the mask is also mounted in a predetermined position to control the location of the foam on the film, the first frame also being subsequently mounted in a predetermined position with respect to the first and second three-dimensionally contoured mold surfaces to control the location of the foam on the film with respect to the mold surfaces, the flexible sheet having printing thereon and being supported on a second frame in a predetermined position with respect thereto, and the second frame being mounted in a predetermined position with respect to the first and second three-dimensionally contoured mold surfaces to control the location of the flexible film and the foam thereon with respect to the printing on the flexible sheet.

5. A method for making a three-dimensionally formed laminate as in claim 4 wherein a second mask is positioned between the flexible sheet and the film with the foam thereon, and the second mask being positioned to align an edge thereof defining an opening of the predetermined shape of the formed laminate in registration with the printing on the flexible sheet to locate the foam with respect to the printing.

6. A method for making a three-dimensionally formed laminate as in claim 5 wherein an angled cutting surface that is heated and engaged with the edge of the second mask to trim foam flash from the formed laminate.

7. A method for making a three-dimensionally formed laminate as in claim 6 wherein a backing layer is secured to the formed laminate by securement thereof to the flexible sheet outwardly from the predetermined shape of its periphery.

* * * * *